US008737200B1

(12) United States Patent
Ould-Brahim (10) Patent No.: US 8,737,200 B1
(45) Date of Patent: May 27, 2014

(54) MPLS/IP PSEUDO-WIRE AND LAYER-2 VIRTUAL PRIVATE NETWORK RESILIENCY

(75) Inventor: Hamid Ould-Brahim, Kanata (CA)

(73) Assignee: Rockstar Consortium US LP, Plano, TX (US)

(*) Notice: Subject to any disclaimer, the term of this patent is extended or adjusted under 35 U.S.C. 154(b) by 1558 days.

(21) Appl. No.: 10/670,568

(22) Filed: Sep. 26, 2003

Related U.S. Application Data (60) Provisional application No. 60/482,019, filed on Jun. 25, 2003.

(51) Int. Cl.
*H04L 12/26* (2006.01)

(52) U.S. Cl.
USPC ............................... 370/225; 370/217

(58) Field of Classification Search
USPC ............. 370/217, 218, 221, 225, 226, 228; 709/239
See application file for complete search history.

(56) References Cited

U.S. PATENT DOCUMENTS

| | | | |
|---|---|---|---|
| 6,751,190 B1* | 6/2004 | Swallow | 370/217 |
| 6,987,727 B2* | 1/2006 | Fredette et al. | 370/225 |
| 7,082,101 B2* | 7/2006 | Kim et al. | 370/225 |
| 7,120,151 B1* | 10/2006 | Ginjpalli et al. | 370/395.1 |
| 7,185,107 B1* | 2/2007 | Cassar | 709/239 |
| 7,707,307 B2* | 4/2010 | Miles et al. | 709/239 |
| 2003/0088698 A1* | 5/2003 | Singh et al. | 709/239 |
| 2003/0147346 A1* | 8/2003 | Kanakubo | 370/227 |
| 2003/0152024 A1* | 8/2003 | Yang et al. | 370/216 |
| 2003/0189898 A1* | 10/2003 | Frick et al. | 370/227 |
| 2004/0133619 A1* | 7/2004 | Zelig et al. | 709/200 |
| 2004/0165600 A1* | 8/2004 | Lee | 370/395.53 |
| 2005/0018605 A1* | 1/2005 | Foote et al. | 370/230 |
| 2005/0044262 A1* | 2/2005 | Luo | 709/238 |

OTHER PUBLICATIONS

E. Rosen et al.; "BGP/MPLS VPNs"; RFC 2547; Mar. 1999, pp. 1-25.*
Hamid Ould-Brahim et al., "Using BGP as an Auto-Discovery Mechanism for Provider-Provisioned VPNs," Internet Engineering Task Force (IETF), May 2003.
Luca Martini et al., "Pseudowire Setup and Maintenance Using LDP," IETF, Feb. 2003.
Stewart Bryant et al., "PWE3 Architecture," IETF, Jun. 2003.
Eric Rosen, "Provisioning Models and Endpoint Identifiers in L2VPN Signaling," IETF, May 2003.
Himanshu Shah, "Extensions to Transport of Layer 2 Frames Over MPLS," IETF, Feb. 2003.

* cited by examiner

*Primary Examiner* — Gary Mui
(74) *Attorney, Agent, or Firm* — Christopher & Wiesberg, P.A.

(57) ABSTRACT

A technique for recovering MPLS or IP-based pseudo-wires or layer-2 VPNs to a backup site using a backup pseudo-wire is provided. In one particular exemplary embodiment, the technique may be realized by a mechanism that allows one end of the original pseudo-wire to dynamically and automatically establish a backup pseudo-wire to an alternate destination without requiring an operator intervention or manual configuration of alternate destinations. This mechanism is triggered when one end of an emulated service experiences a failure such as a node failure, a link failure, and the like, or an intentional shut-down. A VPN auto-discovery mechanism is employed to inform all of the potential attachment circuits of the existence of the backup destinations that can be used in case of failure situations.

18 Claims, 12 Drawing Sheets

MPLS/IP PSEUDO-WIRE AND LAYER-2 VIRTUAL PRIVATE NETWORK RESILIENCY

CROSS-REFERENCE TO RELATED APPLICATIONS

This patent application claims priority to U.S. Provisional Patent Application No. 60/482,019, filed Jun. 25, 2003, which is hereby incorporated by reference herein in its entirety.

FIELD OF THE INVENTION

The present invention relates generally to Virtual Private Networks (VPNs) and, more particularly, to a scalable automated mechanism for establishing backup layer-2 pseudo-wires across an IP/MPLS network for a layer-2 VPN service.

BACKGROUND OF THE INVENTION

In the absence of a privacy mechanism, sensitive data (e.g., passwords, account numbers, proprietary information, etc.) transmitted over a public network may be susceptible to interception by unauthorized parties. One privacy mechanism commonly used to protect network data is a Virtual Private Network (VPN). A VPN typically comprises multiple nodes of one or more private networks, which communicate among themselves across a provider network(s) as if the nodes were connected by private lines (i.e., dedicated point-to-point connections). Multiple VPNs can share a common physical infrastructure without compromising the security of each individual VPN.

Most network-based VPNs rely on tunneling to create the "virtual" connections that extend across the public portion of a network backbone. Tunneling is the process of encapsulating a header and/or payload of a packet within another packet prior to transmission of an original packet over the public network. Generally, the transmission of a VPN-based packet only uses the protocol of the public network, for example, the information such as the Internet Protocol (IP) addresses of the ends of the tunnels where the packet enters and exits the public network (referred to as Provider Edge (PE) devices). Sensitive information encapsulated within the VPN-based packet is in essence, transparent to the PE devices and intermediate nodes of the public network. As a result, the sensitive data carried in the encapsulated packet is incomprehensible to anything other than those authorized devices on the private network side connected to an appropriate PE device. Exemplary tunneling protocols include, but are not limited to IP/IP tunneling, Layer-2 Forwarding (L2F) tunneling, Point-to-Point Tunneling Protocol (PPTP), Generic Router Encapsulation (GRE) tunneling, IP Security (IPSec) tunneling, and Multi-Protocol Label Switching (MPLS) tunneling. The configuration of a VPN tunnel is typically specific to the particular type of VPN used.

A typical IP-based VPN generally includes at least two provider edge devices (e.g., a VPN-enabled router) interconnected via a series of provider devices (e.g., routers) that form a network backbone, where the network backbone typically includes one or more public networks, such as, for example, the Internet or a wide area network (WAN). Connected to each PE device are one or more customer edge (CE) devices. As understood in the art, CE devices may include any of a variety of networked devices, such as personal computers, laptops, workstations, and the like. In this type of network-based VPN, VPN tunnels are established between PE devices, rather than between CE devices.

Regardless of the VPN mechanism used, a primary step in establishing a network-based VPN is to provide information about each VPN configured on a local PE device to a remaining remote PE devices. A number of mechanisms may be implemented to achieve this distribution of PE information such as, for example, Border Gateway Protocol (BGP), Domain Name Service (DNS), Remote Authentication Dial In User Service (RADIUS), and the like. See Hamid Ould-Brahim et al., "Using BGP as an Auto-Discovery Mechanism for Provider-Provisioned VPNs," Internet Engineering Task Force (IETF), August 2003, the entirety of which is hereby incorporated herein by reference. After distributing this PE information, one or more PE-PE tunnels typically are established based in part on information received through the VPN auto-discovery mechanism.

Layer 2 services such as, but not limited to, Frame Relay, Asynchronous Transfer Mode (ATM), and Ethernet may be "emulated" over an MPLS/IP network by encapsulating layer-2 packets and then transmitting them over "pseudo-wires". A pseudo-wire is a mechanism that carries the essential elements of an emulated service from one PE to one or more other PEs over a Packet Switched Network (PSN). See Luca Martini et al., "Pseudowire Setup and Maintenance Using LDP," IETF, February 2003, the entirety of which is hereby incorporated herein by reference; Stewart Bryant et al., "PWE3 Architecture," IETF, June 2003, the entirety of which is hereby incorporated herein by reference; Eric Rosen, "Provisioning Models and Endpoint Identifiers in L2VPN Signaling," IETF, May 2003, the entirety of which is hereby incorporated herein by reference; and Himanshu Shah, "Extensions to Transport of Layer 2 Frames Over MPLS," IETF, February 2003, the entirety of which is hereby incorporated herein by reference. One or more pseudo-wires can be carried inside a PSN tunnel.

Figure 1:
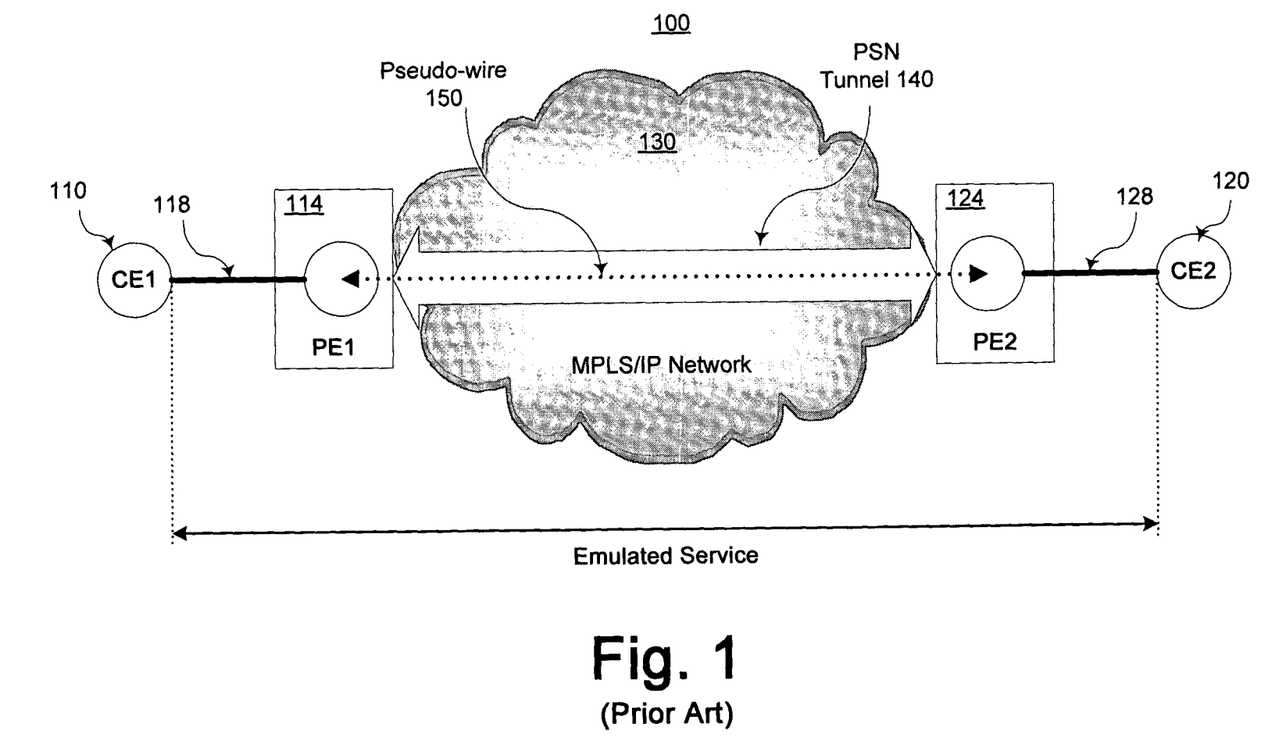
FIG. 1 illustrates an exemplary VPN providing a layer-2 emulated service between two customer edge devices interconnected by a MPLS/IP network.

Referring to FIG. 1, there is shown an exemplary VPN 100 providing a layer-2 emulated service between two customer edge (CE) devices 110 (CE1) and 120 (CE2) via an MPLS/IP network 130. The CE device 110 is connected to a PE device (PE1) 114 via an attachment circuit 118. Similarly, the CE device 120 is connected to a PE device (PE2) 124 via an attachment circuit 128. Connected to each CE device 110 and 120 may be an independent access network (not shown) such as a Local Area Network (LAN). The PE devices 114 and 124 are interconnected via a series of routers or MPLS/IP-enabled layer-2 switches (not shown) that form the MPLS/IP network 130. In this type of network-based VPN, a PSN tunnel 140 is established between PE devices 114 and 124 to encapsulate layer-2 packets transmitted between the CE devices 110 and 120. Inside tunnel 140 is a pseudo-wire 150, which carries the essential elements of the emulated service between PE devices 114 and 124. Although only one pseudo-wire is depicted, it is common to have multiple pseudo-wires carried inside the tunnel 140.

In the event that one end of the pseudo-wire 150 experiences a failure such as a node failure, link failure, or the like, the emulated service provided between customer edge devices 110 and 120 becomes non-operational. In order to reestablish the emulated service in spite of a failure, a new or "backup" pseudo-wire must be employed. Conventional techniques to establish a backup pseudo-wire generally require a person (i.e., an operator) to intervene and manually configure at the non-failing end of the original pseudo-wire a backup endpoint or node in place of the failed end. Manual configuration of a backup pseudo-wire is typically time-consuming, thereby resulting in an undesirable period of time ("downtime") before the emulated service is restored. In addition, conventional techniques place the burden on the backup site to connect to all remote sites. For example, if a particular layer-2 VPN comprises thousands of spoke sites and the hub failed, the backup site would have to manually or dynamically establish a pseudo-wire to the thousands of the other sites. Such a burden could have the adverse effect of overloading the backup site and potentially putting it at risk of failure as well.

In view of the foregoing, it would be desirable to provide an automatic pseudo-wire recovery technique for layer-2 VPN that establishes a backup pseudo-wire in the event of a failure of the original pseudo-wire without requiring manual intervention.

SUMMARY OF THE INVENTION

In accordance with one embodiment of the present invention, a method for providing pseudo-wire resiliency in a Virtual Private Network (VPN) is provided. The method comprises configuring a first pseudo-wire having a remote attachment circuit and a primary attachment circuit; configuring a number of backup attachment circuit identifiers associated with the primary attachment circuit; and executing a VPN auto-discovery mechanism to distribute the identities of the number of backup attachment circuits to the remote attachment circuit. A backup pseudo-wire can be established to one of the number of backup attachment circuits. At least one signal embodied in at least one carrier wave for transmitting a computer program of instructions configured to be readable by at least one processor for instructing the at least one processor to execute a computer process may be used to perform the above method.

In a Virtual Private Network, a system is provided in accordance with another embodiment of the present invention. The system comprises a primary attachment circuit; a remote attachment circuit; and a number of backup attachment circuits, wherein the remote attachment circuit comprises a backup attachment table listing an identity of each of the number of backup attachment circuits. The primary attachment circuit, the remote attachment circuit, and the number of backup attachment circuits can be interconnected by a Multiple Label Switching (MPLS) network or IP-based tunnels.

In a Virtual Private Network, a system is provided in accordance with yet another embodiment of the present invention. The system comprises a first pseudo-wire having a remote attachment circuit and a primary attachment circuit; a number of backup attachment circuits for the primary attachment circuit; and a VPN auto-discovery mechanism to distribute the identities of the number of backup attachment circuits to the remote attachment circuit. A backup pseudo-wire can be established to one of the number of backup attachment circuits.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

The exemplary embodiments described herein provide a technique for recovering MPLS or IP-based pseudo-wires or layer-2 VPNs to a backup site using a backup pseudo-wire is provided. In general, pseudo-wire recovery is realized by a mechanism that allows one end of the original pseudo-wire to dynamically and automatically establish a backup pseudo-wire to an alternate destination without requiring an operator intervention or manual configuration of alternate destinations. This mechanism is triggered when one end of an emulated service experiences a failure such as a node failure, a link failure, and the like, or an intentional shut-down. A VPN auto-discovery mechanism is employed to inform all of the potential attachment circuits of the existence of the backup destinations that can be used in case of failure situations.

The present invention is particularly useful to mitigate service disruptions caused by, for example, but not limited to node failure or node isolation (from routing); layer-2 VPN/pseudo-wire service card failure; administrative shut down of an emulated service; software installation or upgrade; failure of another backup pseudo-wire; link failure; signalling protocol failure; CE-PE signalling or local management protocol failure; and other errors detected by the remote sites.

FIGS. 2-11 illustrate a system and method for automatically establishing a backup pseudo-wire to restore a disrupted emulated layer-2 service across an IP/MPLS network in accordance with at least one embodiment of the invention. As the following paragraphs describe in detail, pseudo-wire resiliency is achieved by employing a data table at each provider end of a pseudo-wire to identify one or more backup attachment circuits (BACs) operable on other nodes in the network if necessary. This table is referred to as a backup attachment table (BAT) and is built by learning from the network information about the backup sites for each primary site. This information is distributed among all appropriate provider edge devices in the VPN via an auto-discovery process. In the event of a failure or disruption at one end (the "primary" end) of the original pseudo-wire, the remote attachment circuit (RAC) at the other end initiates the establishment of a backup pseudo-wire to a backup attachment circuit (BAC) specified in the BAT. A BAC is used only during backup scenarios and generally, does not initiate the establishment of a backup pseudo-wire to the remote end. Nonetheless, a provider can allow the BAC to initiate a backup pseudo-wire in case the BAC is informed first of the failure or the BAC calls the RAC repetitively during normal operations. In this case, when failure occurs the RAC accepts the BAC request to establish a pseudo-wire.

At this point, it should be noted that implementing an automated backup pseudo-wire process in accordance with the present invention as described herein typically involves the processing of input data and the generation of output data to some extent. This input data processing and output data generation may be implemented in hardware or software. For example, specific electronic components may be employed in a node or similar related circuitry for implementing a backup pseudo-wire component in accordance with the present invention as described herein. Alternatively, one or more processors operating in accordance with stored instructions may implement the functions associated with implementing an automated backup pseudo-wire process in accordance with the present invention as described herein. If such is the case, it is within the scope of the present invention that such instructions may be stored on one or more processor readable media, or transmitted to one or more processors via one or more signals.

Figure 2:
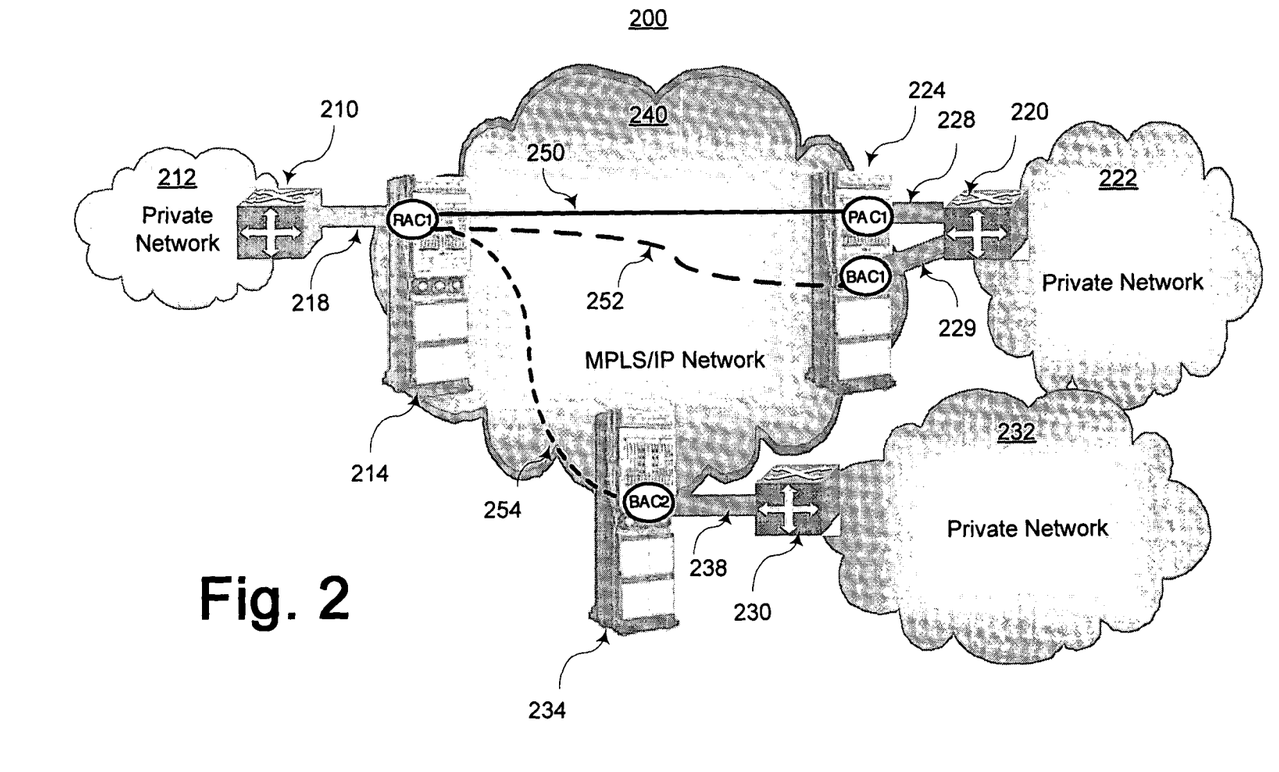
FIG. 2 illustrates an exemplary VPN system featuring two backup pseudo-wires in accordance with at least one embodiment of the present invention.

Referring now to FIG. 2, there is shown an exemplary VPN system 200 featuring pseudo-wire resiliency according to at least one embodiment of the invention. Particularly, the VPN system 200 comprises two backup pseudo-wires to restore an emulated service in the case that an original pseudo-wire fails. The VPN system 200 comprises three CE devices 210, 220, and 230 associated with, for example, respective private networks 212, 222, and 232. The CE device 210 is connected to a PE device 214 via an attachment circuit 218. The CE device 220 is connected to a PE device 224 via two attachment circuits 228 and 229. The CE device 230 is connected to a PE device 234 via an attachment circuit 238. The PE devices 214, 224, and 234 are interconnected by a MPLS/IP network 240. The MPLS/IP network 240 may include any number of provider network devices interconnected using one or more data link types such as, for example, IP, Asynchronous Transfer Mode (ATM), Frame Relay (FR), Time Division Multiplexing (TDM), Ethernet, Optical Ethernet, and the like. The attachment circuits 218, 228, 229, and 238 comprise, for example an ATM port or an ATM virtual path connection (VPC) or virtual circuit connection (VCC), an Ethernet port or an Ethernet Virtual LAN (VLAN) interface, a frame relay port or a frame relay Data Link Connection Identifier (DLCI), a High-Level Data Link Control (HDLC), or a TDM interface. The attachment circuits 218, 228, and 238 may further include devices (not shown) to facilitate network connectivity, such as hubs, routers, switches, bridges, and the like, the implementation of which are apparent to one of ordinary skill in the art.

A pseudo-wire 250 is provided between the attachment circuits 218 and 228. During normal operation, the pseudo-wire 250 emulates a layer-2 service between the CE devices 210 and 220. If needed, a primary backup pseudo-wire 252 can be provisioned between the attachment circuits 218 and 229 to restore the layer-2 service if the pseudo-wire 250 is disrupted. If the primary backup pseudo-wire 252 is unable to be provisioned when needed, a secondary backup pseudo-wire 254 can be provisioned between the attachment circuits 218 and 238 to restore the emulated service. One of ordinary skill in the art recognizes that any one of a number of possible backup pseudo-wires (not shown) can be provisioned, for example, a large number of possible backup pseudo-wires can be on "stand-by" to make certain at least one backup pseudo-wire will be operational in the event that the original pseudo-wire is lost. This number is only limited by applicable network constraints such as the number of available provider edge devices and/or possible backup attachment circuits. Note that the backup pseudo-wires are not active until a failure situation occurs, therefore they do not consume network resources during normal operations.

In order to better illustrate the concepts described herein, the attachment circuit 228 is referred to as the primary attachment circuit (PAC1) and is designated as the side of the original pseudo-wire 250 that experiences a failure or some event that causes disruption to the emulate service. The attachment circuit 218 on the opposite end is referred to as the remote attachment circuit (RAC1) due to its "remoteness" from the side experiencing the failure. The attachment circuits 229 and 238 are respectively referred to as backup attachment circuits (BAC1 and BAC2) as they will only be employed in the event that either of backup pseudo-wires 252 or 254 are necessary.

The primary backup pseudo-wire 252 emulates a layer-2 service between the same PE devices 214 and 224 as if the original pseudo-wire 250 was operational. However, in the event that a failure is associated with a disruption at, for example, the CE device 220 or the PE device 224, establishment of the primary backup pseudo-wire 252 is not feasible. In such a scenario, the VPN system 200 establishes the secondary backup pseudo-wire 254 is established between the PE devices 214 and 234. Assuming either private network 222 and 232 are interconnected or network 222 and network 232 connect intermediate networks leading to the same destination, in these cases the primary emulated service is backed up by pseudo-wire 254.

When a particular PAC is associated with multiple BACs, as is preferable to ensure that at least one backup pseudo-wire is operational, a predetermined policy can be used to select which BAC is implemented first, second, and so on to establish an appropriate backup pseudo-wire. As the exemplary VPN system 200 illustrates, each BAC is given a priority ranking, e.g., primary, secondary, etc. In another embodiment of the invention, a first learnt BAC is considered the first backup and so on. One of ordinary skill in the art recognizes that any method to define the selection order of the possible backup attachment circuits used in case of failures can be employed.

Figure 3:
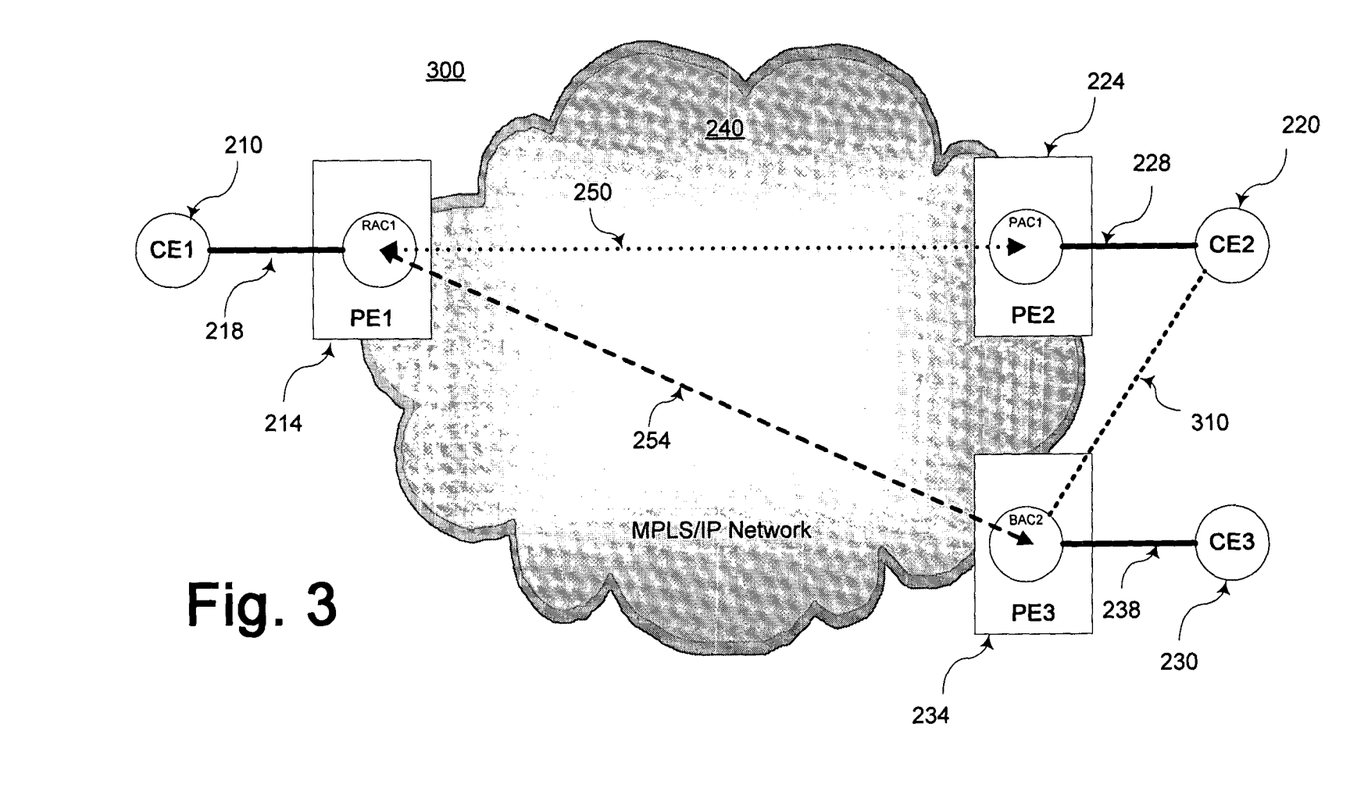
FIG. 3 illustrates an exemplary VPN system featuring a single backup pseudo-wire in accordance with at least one embodiment of the present invention.

According to at least one embodiment of the invention, there is shown in FIG. 3 another exemplary VPN system 300 featuring a single backup pseudo-wire 252 illustrated in VPN system 200 to simplify discussion. The VPN system 300 features an attachment circuit 310 directly connecting the PE device 234 used in a backup scenario to CE device 220. In this scenario, CE device 220 is multihomed to the primary PE device 224 and the backup PE device 234 via attachment circuits 228 and 310, respectively. Note that since the present model allows for a distributed backup mode, it may happen that some component of the primary PE device fails without a complete failure of the PE device. In this case, the primary PE device may decide to redirect the pseudo-wire connection setup to a backup PE directly.

Figure 4:
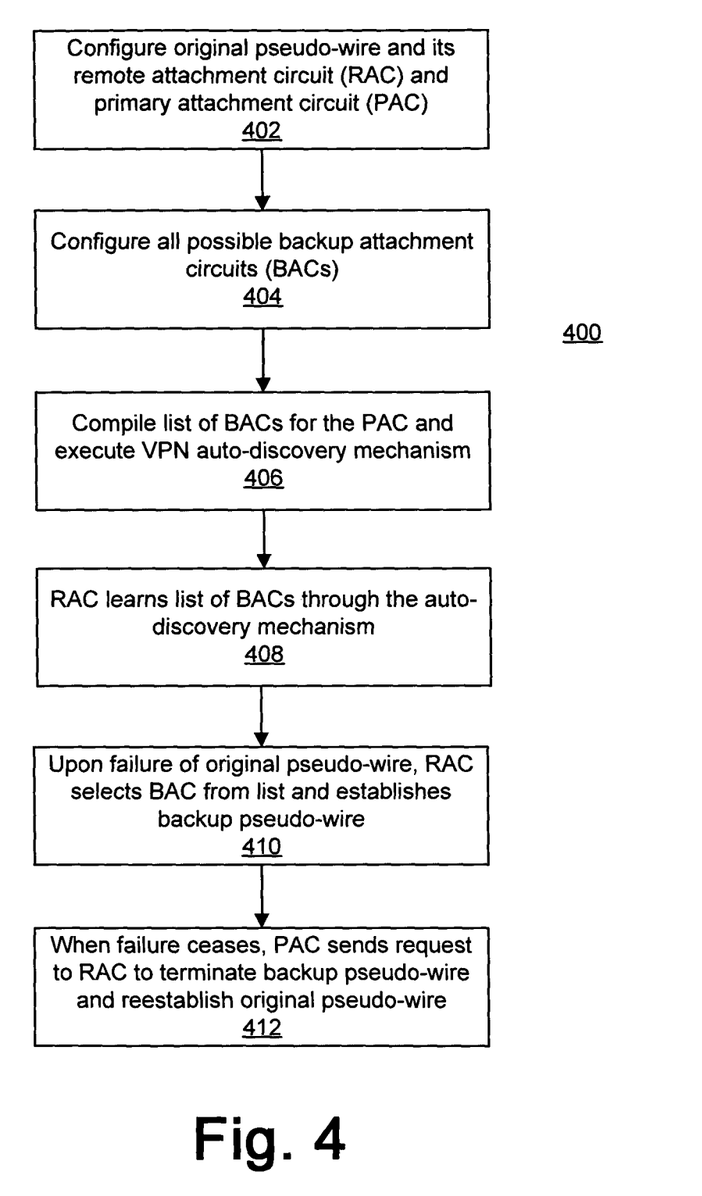
FIG. 4 illustrates a backup pseudo-wire establishment and termination process in accordance with at least one embodiment of the present invention.

FIG. 4 illustrates a flowchart of a process 400 by which a backup pseudo-wire is established and terminated in accordance with at least one embodiment of the present invention. This process shows a particular backup approach where the backup system is triggered by the remote PE device (i.e., the functioning PE device). An operator configures the appropriate backup attachment circuits in the network and an auto-discovery mechanism informs all the relevant PE devices of the pertinent backup information. Note that this invention can "piggyback" the backup information on top of an existing VPN auto-discovery mechanism that is used for either layer-2 or layer-3 VPNs. Another possible approach, is to also have the primary attachment circuit learn all the backup information as well.

The process 400 is initiated by configuring the original pseudo-wire and its remote and primary attachment circuits at step 402. At step 404, all of the possible backup attachment circuits that might be relied upon in the event of a failure are configured. At step 406, a list of all of these back attachment circuits (i.e., the BAT) is compiled via the execution of a layer-2 VPN auto-discovery mechanism, e.g., a BGP based auto-discovery process. For example, the BAT is built incrementally by each provider edge device/attachment circuit learning (i.e., receiving) information coming by way of the discovery process. Further implementation details of this step are described below.

As a result of the execution of the auto-discovery mechanism, the remote attachment circuit and/or the primary attachment circuit learns (i.e., receives/discovers), at step 408 the list of backup attachment circuits. Upon failure of the original pseudo-wire, the primary attachment circuit is taken down and is detected by the remote attachment circuit (by virtue of clearing the primary attachment circuit). At that point, the remote provider edge device may decide to initiate a backup pseudo-wire to the backup attachment circuit. In this approach, the remote attachment circuit selects one BAC from the list in the BAT and initiates a backup pseudo-wire at step 410. When the original pseudo-wire comes back up, i.e., the disruption causing the failure ceases, the primary attachment circuit sends at step 412 an instruction to the remote attachment circuit to terminate the backup pseudo-wire and reinitiate the original pseudo-wire.

Figure 5A:
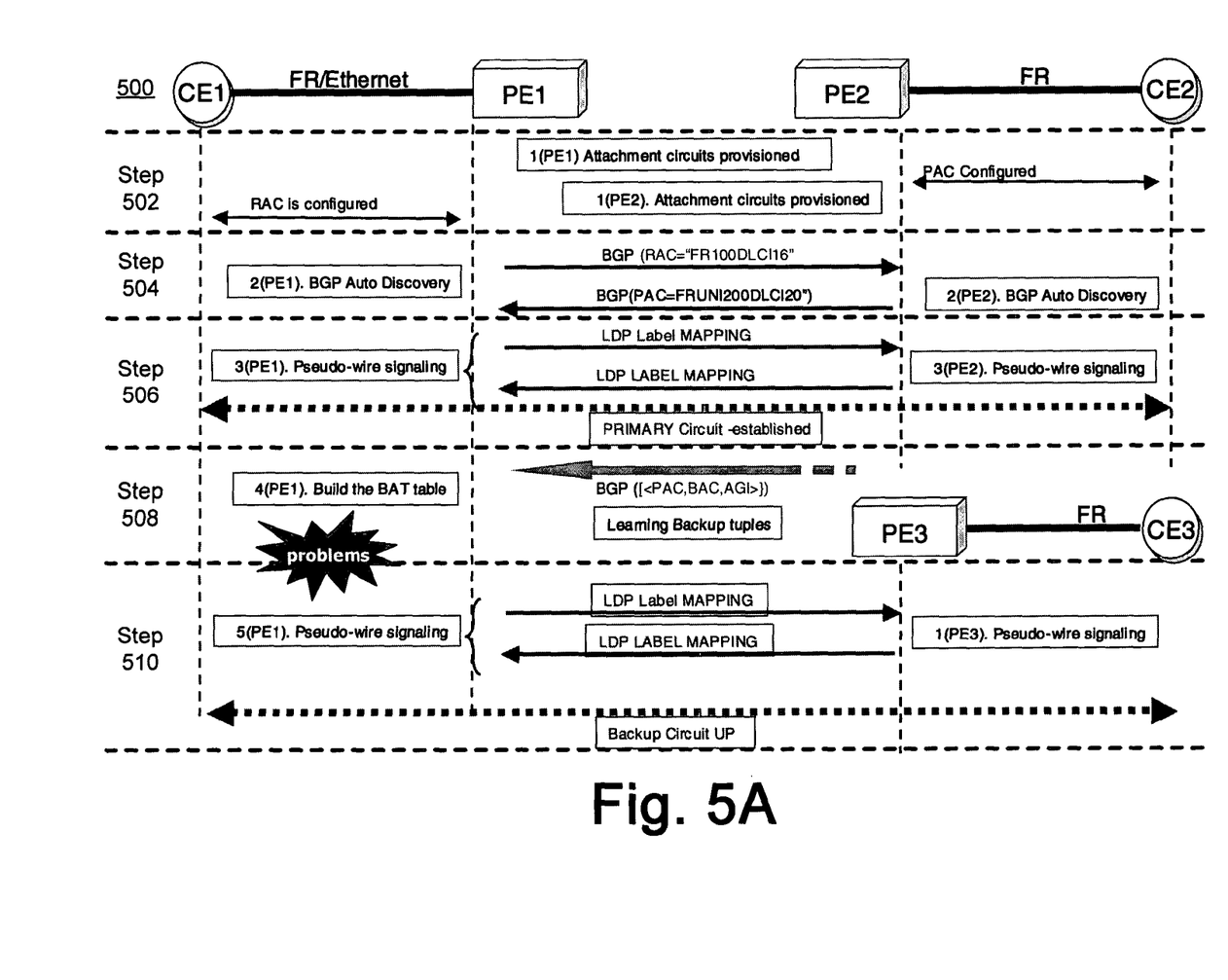
FIGS. 5A and 5B illustrate a resiliency communications process using LDP signaling protocol in accordance with at least one embodiment of the invention.
Figure 5B:
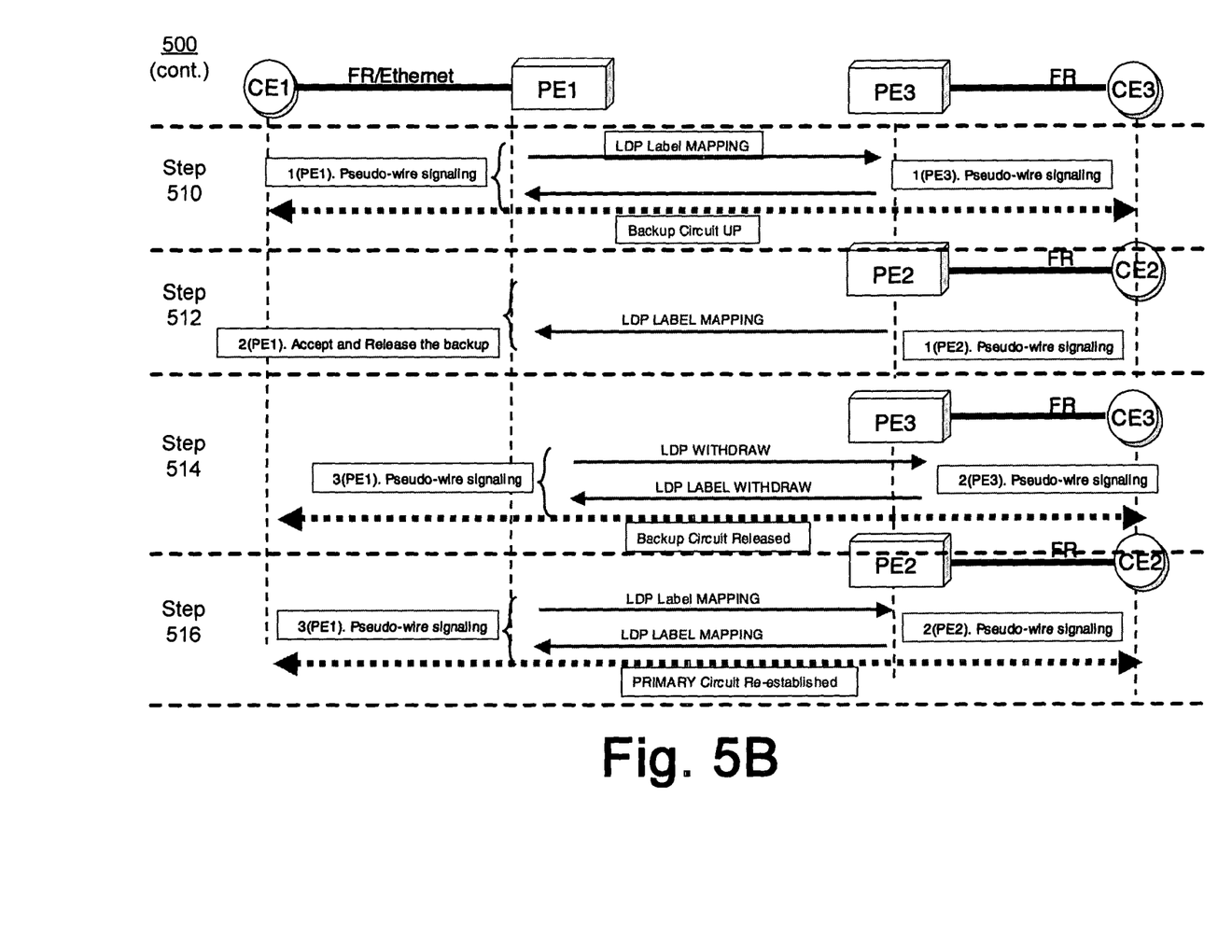

FIGS. 5A and 5B illustrate a resiliency communications process 500 detailing the communications exchanged and actions taken by the system 300 in the establishment and termination of the backup pseudo-wire 254 according to at least one embodiment of the invention. Referring to FIG. 5A, the process 500 is initiated at step 502 by provisioning, the implementation of which is described in detail below, the primary and remote attachment circuits at respective PE device 214 (PE1) and PE device 218 (PE2), thereby resulting in the proper configuration of the PAC1 and RAC1 identifiers. As shown, the primary and backup attachment circuits are frame relay virtual circuits. At step 504, PE1 214 sends an identification of the RAC1, e.g., an address such as "FR100DLCI16", to the PE2 218 via an auto-discovery process at step 506. Similarly, PE2 sends identification of the PAC1, e.g., an address such as "FRUNI200DLCI20", to the PE2 218. At step 506, PE1 and PE2 exchange pseudo-wire signaling such as Label Distribution Protocol (LDP) signaling, the implementation of which is apparent to one of ordinary skill in the art. LDP is the basic protocol that is used for the distribution of labels to the routers, i.e., Label Switched Routers (LSRs), of the MPLS network 240. Completion of step 506 establishes the pseudo-wire 250.

At step 508, the BAT is built at the remote attachment circuit 218. The BAT is populated from the result of running the auto-discovery mechanism. For example, BAT entries are recorded by learning from the auto-discovery process the list of BACs received from the network. Each BAT entry preferably comprises tuple information such as the identity of the RAC, the identity of the PAC, the identity of a BAC, and the priority associated with the BAC. It is important to note that the establishment of the original pseudo-wire and the distribution of backup information are two independent processes. Hence, step 508 may be performed before step 506. In the event that a failure (problem) occurs, pseudo-wire signaling is exchanged at step 510 to establish the appropriate backup pseudo-wire, e.g., backup pseudo-wire 254.

Referring to FIG. 5B, once the problem causing the failure ceases, the backup pseudo-wire 254 is released and the original pseudo-wire 250 is reestablished. For example, at step 512, the primary PE2 signals PE1 via LDP a new pseudo-wire request. Upon receiving the request, PE1 knows that the primary is functioning again and then releases the backup pseudo-wire 254 and re-establishes the primary circuit. At step 514, PE1 and PE3 exchange LDP signals to withdraw the LDP label which indicates that PE1 intends to terminate the backup connection, thereby releasing the backup pseudo-wire 254. At step 516, PE1 and PE2 exchange LDP signals to reestablish the pseudo-wire 250.

Figure 6:
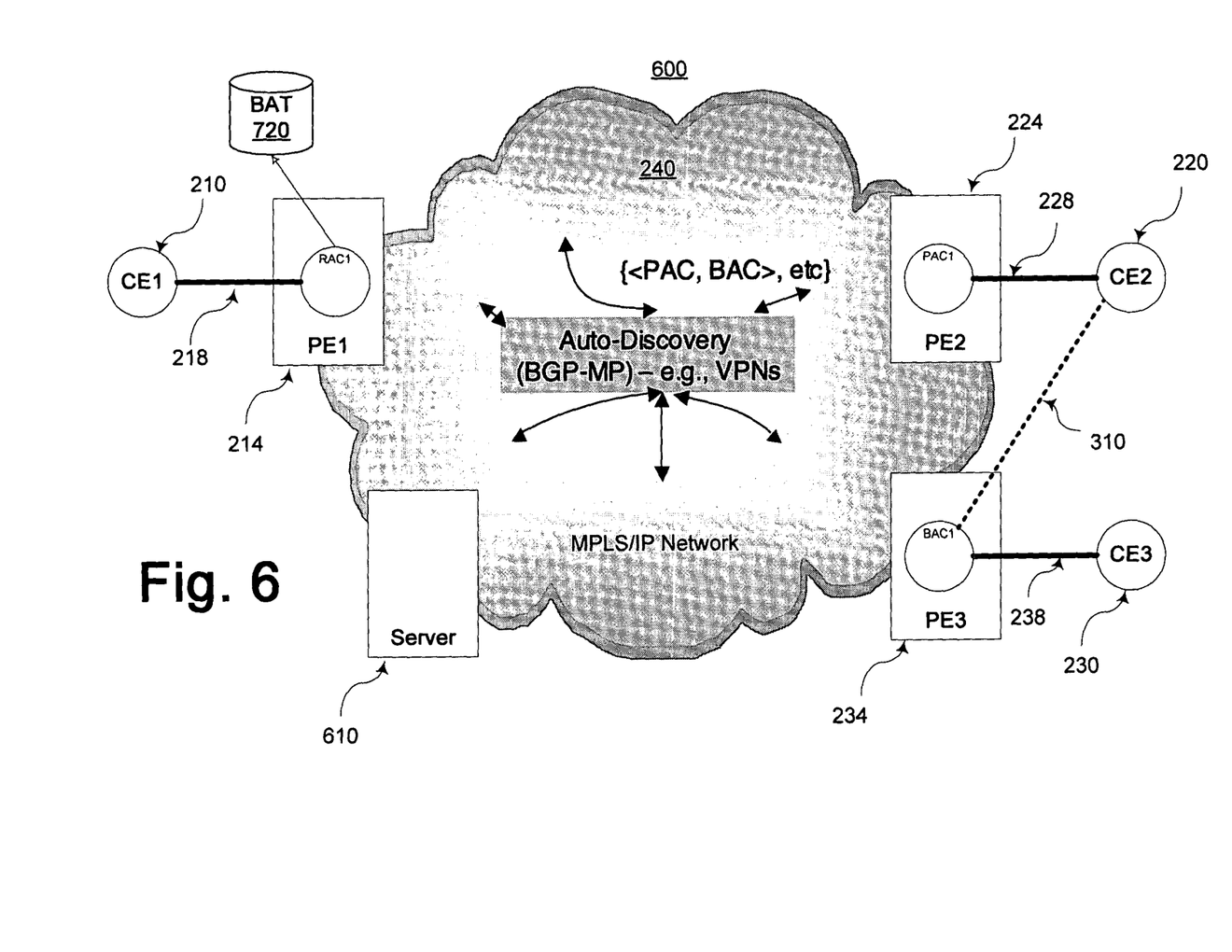
FIG. 6 illustrates a VPN system 600 exchanging tuples via a VPN auto-discovery process in accordance with at least one embodiment of the invention.

FIG. 6 illustrates a VPN system 600 illustrating the exchange of tuples via a VPN auto-discovery process according to at least one embodiment of the invention. The VPN system 600 optionally includes a server 610 connected to the MPLS/IP network 240 for provisioning the attachment circuits 218, 228, and 238. A BAT table 620 resides at the RAC1 218 and optionally at PAC 228. The auto-discovery process distributes the BAT table 620 to each PE having a resilient attachment circuit configured (or dynamically created).

In accordance with at least one embodiment of the invention, two provisioning modes are provided: (i) a server mode and (ii) a distributed mode. In the server mode, the list of tuples <PAC, BAC>, e.g., BAT table 620, are configured on the server node 610. The server node distributes the BAT table 620 to the PE devices 214, 224, and 234 using the auto-discovery process or other scheme, the identification and implementation of which is apparent to one of ordinary skill in the art. The operator may configure the list of tuples on a given node and feed that information to the network management or the discovery mechanism to distribute that information to each relevant PE. Note that the server node does not need to know where the attachment circuits are configured (in other words it does not need to know the IP address of the PEs where the attachment circuits are configured).

Figure 7:
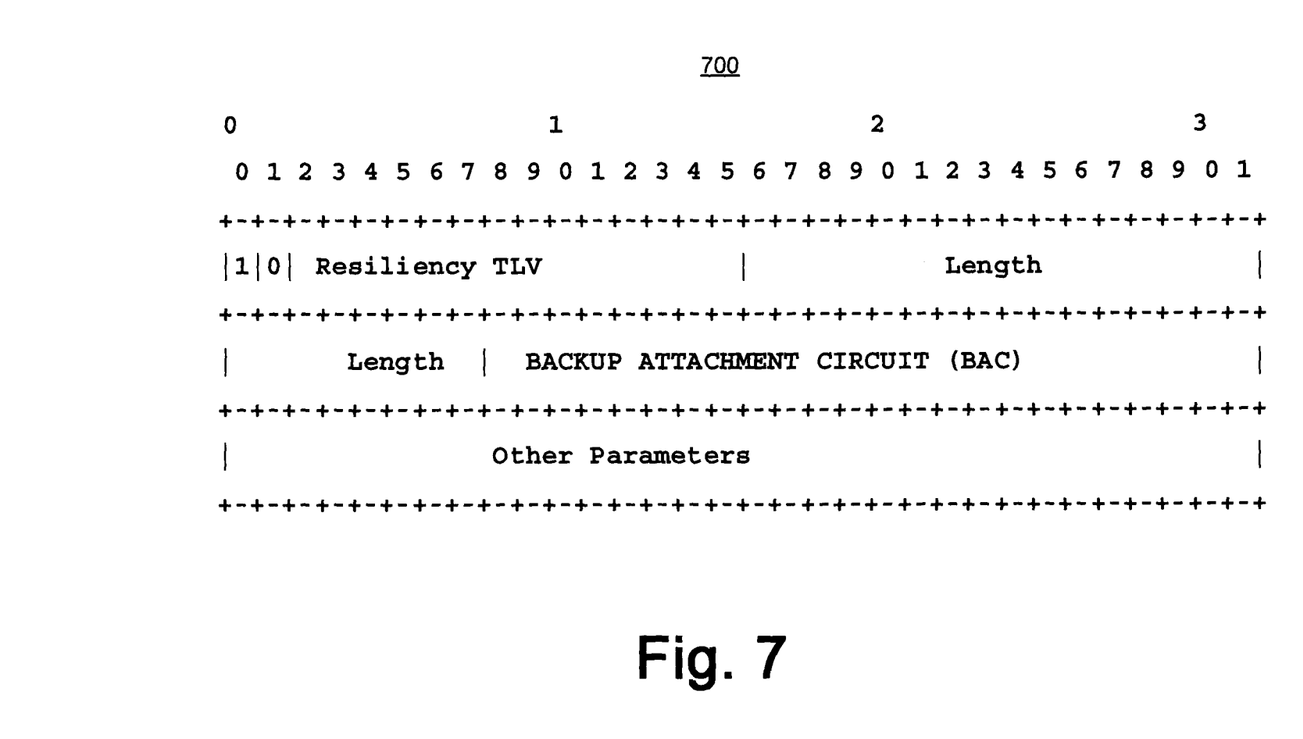
FIG. 7 illustrates an exemplary Resiliency TLV message in accordance with at least one embodiment of the invention.

The distributed mode can be categorized into two sub-modes. For example, in a "backup" distributed mode, each backup attachment circuit is configured with its corresponding primary attachment circuit (in that case the primary is not configured with any backup information). Alternatively, in a "primary" distributed mode, each backup attachment circuit is configured with its primary attachment circuit. The operator may choose a particular backup mode depending on the backup approach. Note that in the distributed mode where the backup is configured with primary, the primary may learn the backup information by receiving that information through the discovery process. Regardless of the type of distributed mode, an example of Type-Length-Value (TLV) formatted message is added to the normal discovery/signaling of layer-2 VPN information to distribute the identities of the BACs. This message is referred to as a Resiliency TLV. In accordance with at least one embodiment of the invention, an exemplary Resiliency TLV message 700 is employed as shown in FIG. 7. This TLV includes the following fields: a one octet length field for this TLV, followed by a backup attachment circuit identifier, which is followed by an other parameters field (used in case the operator wants to transmit special information about the backup system).

Rosen signaling has been introduced in order to provide a single-sided provisioning model (see Eric Rosen, "Provisioning Models and Endpoint Identifiers in L2VPN Signaling," IETF, May 2003, the entirety of which is hereby incorporated herein by reference). The following describes how a Resiliency TLV can be carried in a BGP auto-discovery mechanism using Rosen signaling. As part of a BGP auto-discovery procedure, each PE advertises its <VPN-ID, local AII,> pairs, the implementation of which is apparent to one of ordinary skill in the art. A PE having a PAC with BACs configured advertises the list of <VPN-ID, local BACs>, VPN-ID representing the VPN membership. Note that the backup attachment circuit has the same membership scheme as the primary attachment circuit via BGP. The Resiliency TLV 700 is added to the Rosen signaling information elements in the BGP NLRI (Network Layer Reachability Information) field. Alternatively, the resiliency TLV 700 is carried in a BGP multi-protocol extension attribute along with layer-2 VPN information. Note that the use of the resiliency TLV 700 is optional, thereby allowing a given PE that does not understand the resiliency TLV 700 to ignore it.

Figure 8:
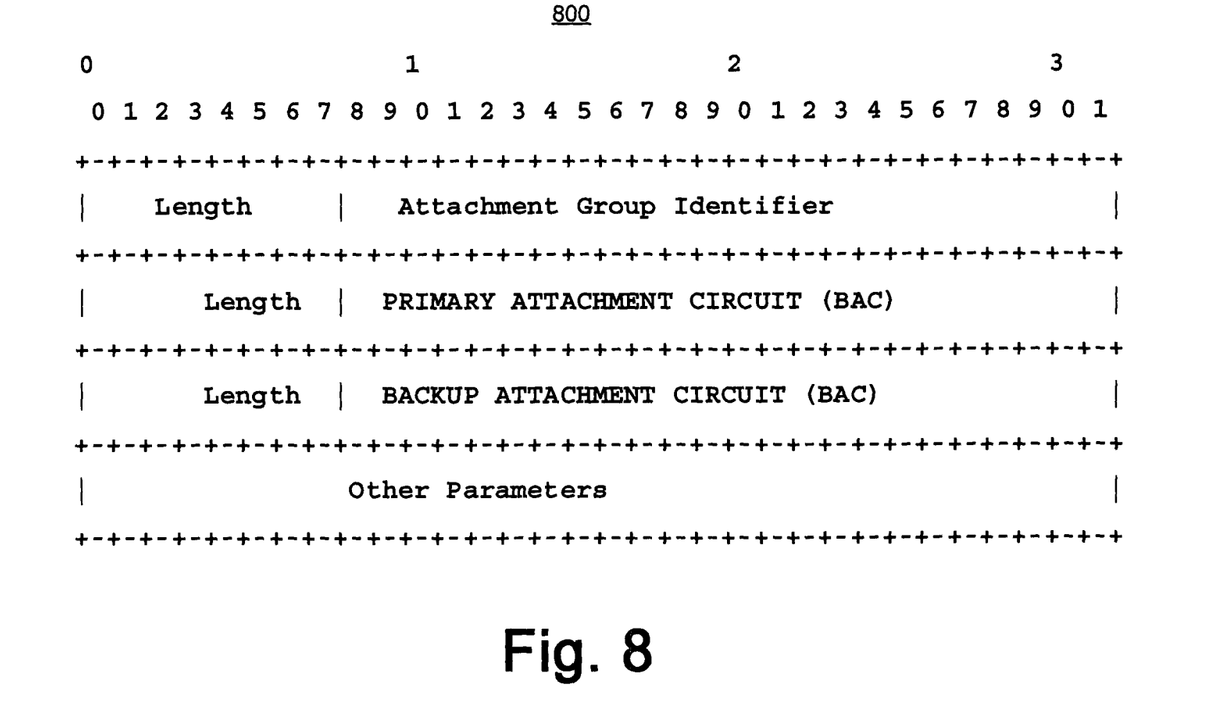
FIG. 8 illustrates an exemplary BGP multi-protocol message carrying resiliency information in accordance with at least one embodiment of the invention.

In the server mode, resiliency information is carried in BGP multi-protocol extensions. Referring to FIG. 8, there is shown an exemplary BGP multi-protocol message carrying appropriate resiliency information in accordance with at least one embodiment of the invention. The first field is the length field of the attachment group identifier. The attachment group identifier represents the VPN membership of the primary and backup attachment circuits. The following fields are the primary attachment circuit identifier and the backup attachment identifier. Each RAC stores the list of tuples <RAC, PAC, BAC, priority> constructed from the discovery mechanism. Therefore, the server operator does not need to configure the RAC side with backup information. The BAC may or may not send a pseudo-wire establishment request as the BAC generally waits for the appropriate Label Mapping (setup request) from the RAC. Note that the backup may send a pseudo-wire establishment request. In this case, the RAC may use this technique to know that the backup is functioning. The BAC participates in the auto-discovery process by advertising its backup identifiers to the VPN auto-discovery mechanism.

Figure 9:
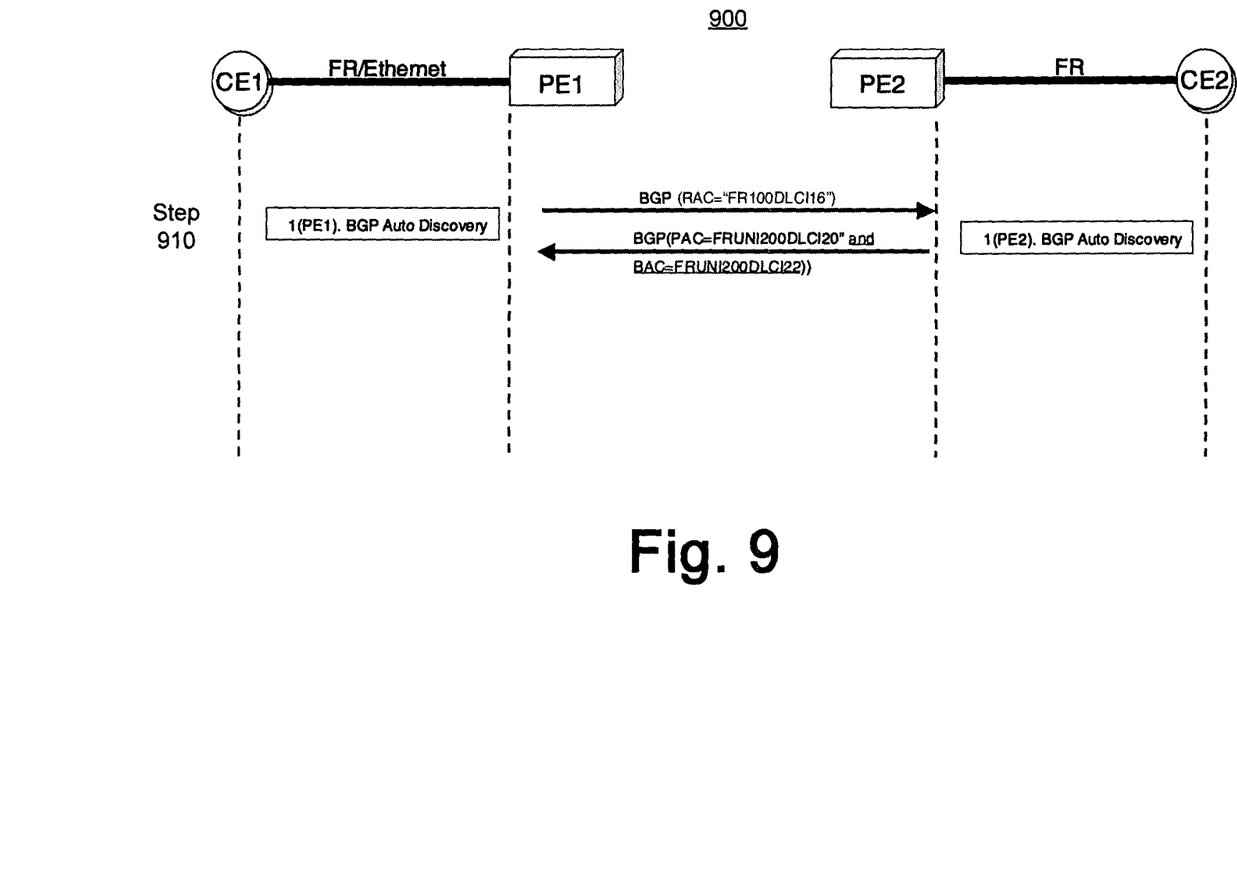
FIG. 9 illustrates a distributed mode provisioning process in accordance with at least one embodiment of the invention.

FIG. 9 illustrates a provisioning process 900 in the distributed mode according to at least one embodiment of the invention. In this scenario, the primary edge device informs the remote attachment circuit of the existence of the backup attachment circuit at step 910. The information exchanged is the primary attachment identifier and the backup attachment identifiers.

Figure 10:
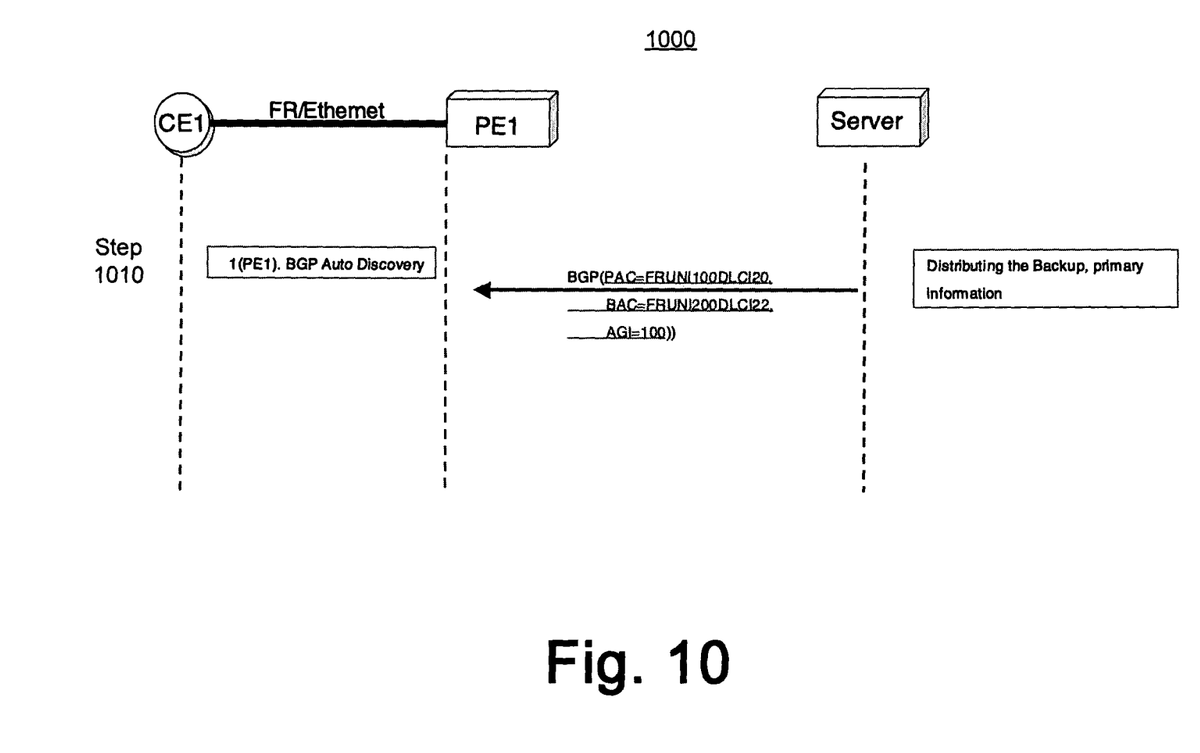
FIG. 10 illustrates a server mode provisioning process in accordance with at least one embodiment of the invention.

FIG. 10 illustrates a provisioning step 1000 in the server mode according to at least one embodiment of the invention. At step 1010, the server informs the remote attachment circuit of tuples primary and backup identifiers including the VPN membership of the identifiers represented through the use of group attachment identifier.

As an option, the primary attachment circuit 228 or PE device 224 may redirect the original label mapping received from the RAC to the server 610 in case some of the components of PE 224 failed but not all. The server node decides whether to accept (based on criteria determined by the operator) the redirected label mapping messages. In such a scenario, the label mapping is then forwarded to the backup attachment circuit 238 by the server 610. The backup attachment circuit 238 may accept the label mapping and initiate a reverse label mapping to the remote attachment circuit 218.

Figure 11:
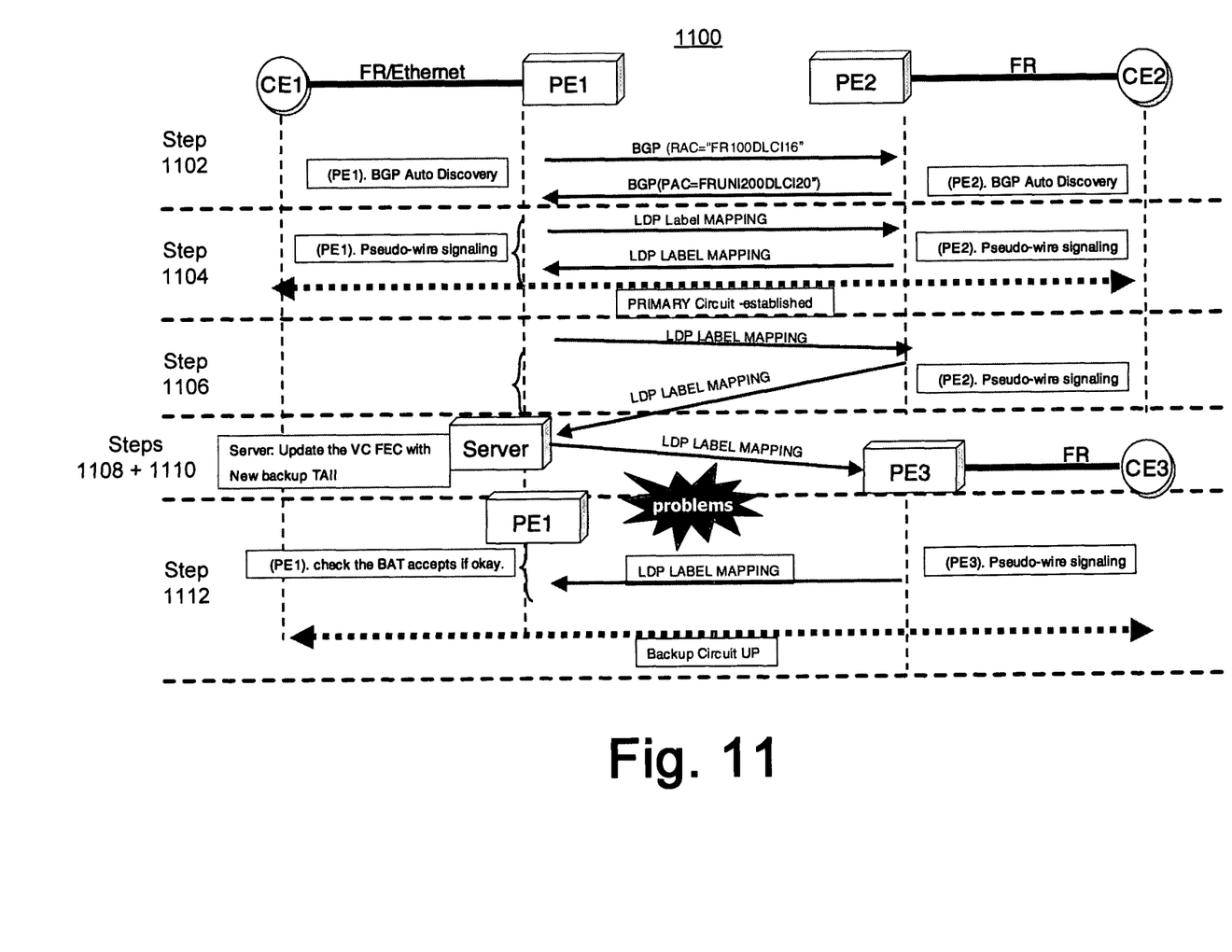
FIG. 11 illustrates a label mapping redirection process in accordance with at least one embodiment of the invention.

Referring now to FIG. 11, there is shown a label mapping redirection process 1100 according to at least one embodiment of the invention. At step 1102, PE1 214 sends an identification of the RAC1, e.g., an address such as "FR100DLCI16", to the PE2 218 via an auto-discovery process at step 506. Similarly, PE2 sends identification of the PAC1, e.g., an address such as "FRUNI200DLCI20", to the PE2 218. At step 1104, PE1 and PE2 exchange pseudo-wire LDP signaling to establish establishes the pseudo-wire 250. At step 1106, the primary attachment circuit decides to send the label mapping to the backup server node 610 (based on the failed components). For example, the PE holding the primary attachment circuit may have a failed CE-PE link. This PE may accept a network request from the RAC, but it has been instructed to redirect the request to a server. Note that the server node can as well be any provider edge node (PE). At step 1108, the backup server node 610 looks up the Target Attachment Identifier (TAII) carried within the label mapping. The TAII is in fact the primary attachment circuit identifier. The server 610 searches for an existing entry in its list of provisioned tuples PACs with their corresponding BACs where the PAC equals TAII. At step 1110, if an entry is found, the server node sends the label mapping to the backup attachment circuit.

At step 1112, the backup attachment circuit sends a reverse label mapping to the RAC. If the RAC finds an entry in the BAT of the backup attachment circuit, it accepts the reverse label mapping and the backup pseudo-wire is established. When the original pseudo-wire returns, the PAC sends a label mapping to the RAC, which terminates its connection to the backup attachment circuit and reestablishes the original pseudo-wire. Note that this exemplary embodiment does not exclude the redirection of pseudo-wire setup message (label mapping) triggered by another system other than the primary site (for example routing protocol may decide to forward the label mapping to the server).

A backup interface does not need to be of the same layer-2 type as the primary interface. For example, a primary ATM interface can be backed up by a GigEthernet interface as long as the basic signaling using in establishing the pseudo-wires supports interworking capabilities. The discovery of backup information does not need to convey (although it can) interface type information or encapsulation information.

One example of the usefulness of the present invention is its employment during software upgrades that affect service operations. In that case, the operator may use the resiliency provided herein to direct traffic automatically to a backup (hub as an example), while upgrading the node, and once the upgrade is done all the remote spokes will reestablish their call to the primary site, virtually eliminating any operator intervention on the spoke side.

A pseudo-wire can support status information signaling about an attachment circuit and inform the remote end about the status of the components of the primary attachment circuit or primary PE. In that case, the receiving PE device of the status may decide based on the nature of the status (for example the status may indicate the link is failing) to keep the pseudo-wire up and initiate a backup service. The RAC lookup the status information and may decide upon local policy to initiate a backup service (for example establish backup when status indicates link failures).

In a Switched Virtual Circuit (SVC) case, the primary attachment circuit may decide, for example, in the event where an attempt to establish a primary circuit failed, to initiate a call to a backup attachment circuit upon learning all the backup attachment circuits. Note that in such a case, group IDs of the attachment circuits can be used and a backup pseudo-wire is triggered based on the group IDs and not on the individual attachment circuits. This backup approach maybe used when the operator decides that any of the backup attachment circuit can service many primary attachment circuits and there is no need to configure the tuple backup attachment circuit and its corresponding primary attachment circuit. All that is needed is the primary and backup tagged with membership information. The primary is backed by any backup that shares the same tag.

A backup service can be initiated upon the "graceful" restart of the LDP signaling protocol as defined in "Graceful Restart Mechanism for Label Distribution Protocol," The Internet Society, February 2003, the entirety of which is hereby incorporated herein by reference. For example, a failure of the signaling protocol in one PE may trigger the backup emulated service during the graceful restart process. An example of graceful restart with resiliency interworking allows the backup mechanism to be initiated when the timers for recovering LDP sessions expire.

It the event that the operator enforces a policy that "any BAC" within a group can be used, the backup group ID can be used to backup a primary group Id, which designates a set of primary attachment circuits.

Because a layer-2 VPN comprises a set of sites sharing the same membership scheme and are interconnected through a set of pseudo-wires, implementation of a policy wherein a hub site can be recovered to another backup without requiring manual configuration of the backup pseudo-wires (upon a failure the resilient RACs which are the spokes will dynamically establish a backup pseudo-wire to the hub) is possible.

Note that it is not necessary that a layer-2 VPN solution is implemented in order to use the backup emulated service. An auto-discovery mechanism can be used exclusively with even when no VPNs are supported. In that case, the auto-discovery carries the resiliency TLV 700 with no layer-2 VPN information.

The invention is applicable to hierarchical/distributed Virtual Private LAN services as well as switched layer-2 VPNs (Switched virtual circuit cases). Indeed, an Ethernet port/VLAN can backup any primary Ethernet ports member of a given Virtual Private LAN service (VPLS). Upon failure of the primary Ethernet port, the backup port can be activated. For hierarchical and distributed VPLS, the network facing PE can establish backup pseudo-wires to other virtual backups destinations. The virtual backup destinations are as well connected to remote sites through normal pseudo-wires.

One advantage of the invention is that it provides an operator with a range of approaches to perform backup recovery using common building blocks (i.e., discovery process).

Another advantage of the invention is to eliminate operator intervention or manual configuration to restore an emulated service in the event that a failure occurs at one end of an original pseudo-wire. Compared to conventional pseudo-wire recovery techniques, disruption to an emulated service is significantly reduced.

Another advantage of the invention is that it enhances and improves current IP/MPLS-based layer-2 disaster recovery strategy. Moreover, the invention does not require and consume network resources to implement a recovery technique before a failure occurs.

Yet another advantage of the invention is that it establishes a backup pseudo-wire in less than a minute or even seconds (depending on the time required by the signaling protocols) upon failure.

In the case of a hub failure, the present invention distributes the decision to connect to the backup site to all "working" sites (of a failed site). Each working site will decide to initiate a connection setup to the backup site. If the working site finds out for example that the load of the backup site is too heavy it may decide to use another backup site that has enough CPU and/or memory resources.

Another benefit of this invention is the ability to provide mobility at the backup site as the present invention requires no manual intervention not just for establishing the backup, but as well as for learning what are the potential backups for a given destination. If a backup system is moved to another location or another port or another device, it is not required to reconfigure the primary and the working sites with new backup information. The new sites will automatically re-learn the information via auto-discovery mechanism.

Another advantage of the invention is that it enables providers deploying MPLS or IP-base layer-2 VPNs to improve the robustness of the provided layer-2 VPN services when such services are potentially disrupted by failures and/or operational interventions.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for providing pseudo-wire resiliency in a Virtual Private Network (VPN), the method comprising:

configuring a first pseudo-wire for facilitating an emulated service in the VPN, the first pseudo-wire being provided between a remote attachment circuit and a primary attachment circuit, each attachment circuit being an interface circuit between a customer edge device at an edge of the VPN and a provider edge device at an edge of a Multiprotocol Label Switch/Internet Protocol (MPLS/IP) network;

configuring at least one backup attachment circuit associated with the primary attachment circuit;

executing an auto-discovery mechanism to distribute identities of the at least one backup attachment circuit to the remote attachment circuit;

initiating, upon being informed of a failure, via the one of the at least one backup attachment circuit, establishment of a backup pseudo-wire from the one of the at least one backup attachment circuit to the remote attachment circuit; and further comprising selecting a backup attachment circuit from the at least one backup attachment circuit based on an order in which the at least one backup attachment circuit was discovered by the auto-discovery mechanism.

2. The method of claim 1, further comprising establishing a backup pseudo-wire to one of the at least one backup attachment circuit.

3. The method of claim 2, wherein establishing a backup pseudo-wire is related to a result of a graceful restart.

4. The method of claim 2, wherein the identities of the at least one backup attachment circuit is provided by a server.

5. The method of claim 4, wherein establishing a backup pseudo-wire is initiated by the server.

6. The method of claim 2, further comprising
releasing the backup pseudo-wire; and
reestablishing the first pseudo-wire.

7. The method of claim 1, wherein the mechanism is a Border Gateway Protocol (BGP) based auto-discovery mechanism.

8. The method of claim 1, wherein the execution of the mechanism distributes the identities of the at least one backup attachment circuit to the primary attachment circuit.

9. At least one processor readable medium for storing a computer program of instructions configured to be readable by at least one processor for instructing the at least one processor to execute a computer process for performing the method as recited in claim 1.

10. A VPN system comprising:
a primary attachment circuit, the primary attachment circuit being an interface circuit provided between a first customer edge device at an edge of the VPN and a first provider edge device at an edge of a Multiprotocol Label Switch/Internet Protocol (MPLS/IP) network;
a remote attachment circuit, the remote attachment circuit being an interface circuit provided between a second customer edge device at a remote edge of the VPN and a second provider edge device at a remote edge of the MPLS/IP network;
at least one backup attachment circuit associated with the primary attachment circuit, the remote attachment circuit comprising a backup attachment table listing an identity of each of the at least one backup attachment circuit the primary attachment circuit and the remote attachment circuit facilitating a first pseudo-wire in the VPN, and one of the at least one backup attachment circuit being configured to initiate establishment of a backup pseudo-wire from the one of the at least one backup attachment circuit to the remote attachment circuit in the event that the first pseudo-wire is disrupted; and
the one of the at least one backup attachment circuit configured to initiate establishment of a backup pseudo-wire is selected from the at least one backup attachment circuit based on an order in which the at least one backup attachment circuit was discovered by an auto-discovery mechanism.

11. The VPN system of claim 10, wherein the primary attachment circuit, the remote attachment circuit, and the at least one backup attachment circuit are interconnected by one of a Multiple Label Switching (MPLS) network and IP-based tunnels.

12. The VPN system of claim 10, further comprising: a server node that distributes the identities of each of the at least one backup attachment circuit to the remote attachment circuit.

13. The VPN system of claim 10, further comprising: a customer edge device interconnected to the remote attachment circuit.

14. The VPN system of claim 13, further comprising: a customer edge device interconnected to the primary attachment circuit; and a communications link connecting the customer edge device to the one of the backup attachment circuits.

15. A system for providing pseudo-wire resiliency in a VPN, the system comprising:
a first pseudo-wire for facilitating an emulated service in the VPN, the first pseudo-wire being provided between a remote attachment circuit and a primary attachment circuit, each attachment circuit being an interface circuit between a customer edge device at an edge of the VPN and a provider edge device at an edge of a Multiprotocol Label Switch/Internet Protocol (MPLS/IP) network;
at least one backup attachment circuit for the primary attachment circuit, one of the at least one backup attachment circuit configured to initiate establishment of a backup pseudo-wire from the one of the at least one backup att chment circuit to the remote attachment circuit, upon being informed of a failure by the one of the at least one backup attachment circuit;
a VPN auto-discovery mechanism to distribute the identities of the at least one backup attachment circuit to the remote attachment circuit; and
the one of the at least one backup attachment circuit configured to initiate establishment of a backup pseudo-wire is selected from the at least one backup attachment circuit based on an order in which the at least one backup attachment circuit was discovered by an auto-discovery mechanism.

16. The system of claim 15, further comprising: a backup pseudo-wire provisioned between the remote attachment circuit and the one of the at least one backup attachment circuit; means for selecting a backup attachment circuit from the at least one backup attachment circuit; and means for prioritizing the at least one backup attachment circuit.

17. The system of claim 16, further comprising: means for releasing the backup pseudo-wire; and means for reestablishing the first pseudo-wire.

18. The system of claim 16, wherein the VPN auto-discovery mechanism is a Border Gateway Protocol (BGP) based auto-discovery mechanism.

* * * * *